United States Patent [19]

Heitman

[11] Patent Number: 4,624,500
[45] Date of Patent: Nov. 25, 1986

[54] ASSEMBLY FOR DAMPENING VIBRATION OF A GLASS PANEL IN A VEHICLE

[75] Inventor: Theodore A. Heitman, Libertyville, Ill.

[73] Assignee: Dresser Industries, Inc., Dallas, Tex.

[21] Appl. No.: 739,340

[22] Filed: May 30, 1985

[51] Int. Cl.$^4$ ............................................. B60J 1/00
[52] U.S. Cl. ................................ 296/146; 296/95 R; 296/190; 49/50
[58] Field of Search ............... 296/190, 146, 84 R, 296/84 K, 95 R; 188/378, 379; 267/141; 49/50

[56] References Cited

U.S. PATENT DOCUMENTS

| | | | |
|---|---|---|---|
| 810,604 | 1/1906 | Baier | 49/50 |
| 2,549,661 | 4/1951 | Carney | 49/50 |
| 3,004,305 | 10/1961 | Goodemote | 228/180.2 |
| 3,940,177 | 2/1976 | Miers | 296/35 R |
| 3,990,737 | 11/1976 | Palmer | 296/35 R |
| 4,043,586 | 8/1977 | Hofer | 296/84 C |
| 4,512,433 | 4/1985 | van der Lely | 296/190 |

Primary Examiner—Robert R. Song

[57] ABSTRACT

Assembly for dampening vibration of a glass panel mounted in a vehicle window opening bordered by the body panels of the vehicle. A rigid support member is disposed adjacent an inside surface of said glass panel, and is parallel to the vertical axis thereof. A resilient joining member is disposed between the contiguous surfaces of said support member and said glass panel for preventing the glass panel from being excited to vibration amplitudes and frequencies which might cause the glass panel to shatter.

5 Claims, 4 Drawing Figures

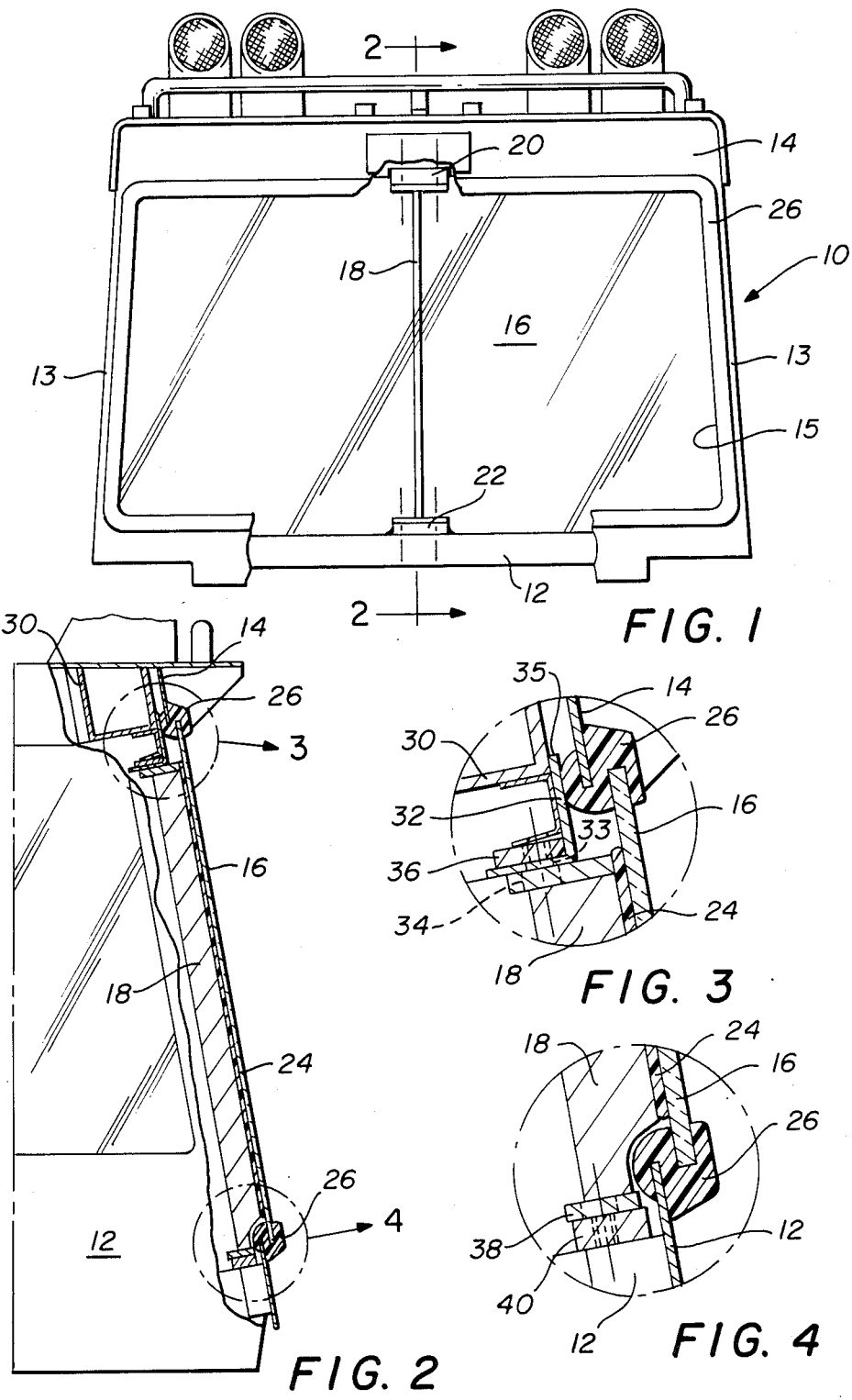

ASSEMBLY FOR DAMPENING VIBRATION OF A GLASS PANEL IN A VEHICLE

BACKGROUND OF THE INVENTION

This invention relates to improvements in mounting large panes of glass, such as the windshields of construction equipment, and in particular, to an assembly for dampening or eliminating the vibration of such large panes of glass.

Construction equipment such as bulldozers, front end loaders, graders and the like, generally have large panes of glass provided at the front end of the operator's cab. During normal operation of the construction equipment, the equipment is often subject to severe vibrations. Such machinery vibrations sometimes excites the large panes of glass located at the front of the operator's cab to amplitudes and frequencies which result in the panes of glass shattering.

Various methods have been proposed in attempting to prevent the shattering of the large panes of glass. One such solution attempted to control the flatness of the glass mounting plane. A second solution involves increasing the stiffness of the glass mounting plane by increasing the structure around the glass panel opening. A third solution involves reducing the area of the glass panel by dividing the panel into two or more smaller, stiffer, panes. Each of the foregoing solutions have inherent deficiencies. For example, controlling the flatness of the glass mounting plane or increasing the stiffness of that plane, involves relatively significant increases in the manufacturing cost for the construction equipment. By utilizing two or more smaller, stiffer panes, the visibility of the operator is reduced by the necessary width of the structure used to unite the two or more panes.

It is an object of this invention to dampen or eliminate vibration of large panels of glass used on construction equipment without interfering with windshield wiper operation or operator's visibility.

SUMMARY OF THE INVENTION

The foregoing object and other objects of the present invention are attained in an assembly for dampening vibration of a glass panel in a vehicle window opening bordered by vehicle body panels, said glass panel having a vertical axis, horizontal axis, a top edge, a bottom edge, and a pair of opposed side edges, first support means connected to the vehicle body and the top edge of the glass panel, and second support means connected to the vehicle body and the bottom edge of the glass panel, wherein the improvement comprises a rigid support member disposed adjacent an inside surface of said glass panel, parallel to the vertical axis thereof; and resilient joining means disposed between the contiguous surfaces of said support member and said glass panel for preventing the glass panel from being excited to vibration amplitudes and frequencies, which cause the glass panel to shatter.

BRIEF DESCRIPTION OF THE DRAWING

FIG. 1 is a front plan view of a glass panel of the type used on a construction vehicle;

FIG. 2 is a sectional view taken along line 2—2 of FIG. 1;

FIG. 3 is an enlarged sectional view of a detail denoted by numeral 3 in FIG. 2; and FIG. 4. is an enlarged sectional view of a detail denoted by numeral 4 in FIG. 2.

DESCRIPTION OF THE PREFERRED EMBODIMENT

Referring now to the drawing, there is disclosed a preferred embodiment of the present invention. In referring to the various figures of the drawing, like numerals shall refer to like parts.

Referring specifically to FIG. 1, there is disclosed a front view of an operator's cab 10 found on a vehicle such as a construction machine. The construction machine may be a bulldozer, front end loader, road grader, or the like. Operator cab 10 includes a lower main crossbar 12, an upper body panel 14 and side panels 13 defining therebetween a vehicle window opening 15. A large pane of glass 16 is mounted within the window opening in a manner to be more fully explained hereinafter. A windshield wiper is connected to either the upper or lower body panels in a known manner for clearing rain water from the exterior surface of glass panel 16.

Referring specifically to FIGS. 2 through 4, details of the present invention will now be described and explained. During operation of a construction machine, it may severely vibrate. Vibration of the machine, in turn may cause the glass panel to become excited to vibration amplitudes and frequencies, which may cause the panel to brake or shatter.

The present invention dampens or eliminates vibration of panel 16. The invention includes a bar or other similar rigid member 18 disposed on the inside surface of panel 16. Member 18 extends parallel to the vertical axis of panel 16, and substantially along the entire vertical height of the panel. The cross-section of member 18 is of sufficient size as to resist the vibration induced by the construction equipment. The long axis of the cross section is perpendicular to glass panel 16. The contiguous surfaces of member 18 and panel 16 are slightly spaced from one another. The space is bridged by a resilient adhesive member 24. In the preferred embodiment, adhesive member 24 is made from Butyl rubber. The Butyl rubber is manufactured in "ribbon" form approximately $\frac{1}{8}$ inch thick by $\frac{3}{8}$ inch wide. The exterior surface of member 24 is tacky. As illustrated, resilient adhesive member 24 may be affixed to the entire length of member 18; however, as an alternative, member 24 may be affixed to bar 18 at selected spaced locations along the length of the bar.

Bar 18 includes a first support piece 34 fixed to the top edge thereof. Leg 33 of bracket 32 is sandwiched between the upper surface of support member 34, and a second support piece 36. Members 34, 33 and 36 are connected together by suitable means, such as bolts or welds. Vertical leg 35 of bracket 32 is likewise connected by suitable securing means to channel member 30 of upper body panel 14.

The bottom end of member 18 has a securing member 38 attached thereto. Member 38 is attached to a member 40 connected to crossbar 12. Thus, it will be observed, member 18 is rigidly secured to upper panel 14 and crossbar 12.

Glass panel 16 is secured to lower crossbar 12 and upper and side panels respectively 14 and 13, via rubber moulding 26 circumferentially surrounding the upper, lower and side edges of the glass panel. Moulding 26 maintains panel 16 in opening 15.

In the preferred embodiment, a single member 18 is used to dampen or eliminate the vibration of panel 16.

Thus, the member is essentially positioned to pass in line with the centroid of panel 16. It should be understood that two or more rigid bars may be used in lieu of the single bar illustrated, in which case, the multiple bars would be positioned in other locations relative to the glass panel, and would not necessarily be in line with the centroid of the panel. Also, it is within the scope of this invention that the bar or bars may be positioned at an angle to the vertical axis of panel 16, with an angular deviation of up to 30 degrees being permissible.

Further, instead of resiliently joining bar 18 to panel 16, adhesive member 24 may be replaced by one or more elastomeric bumpers affixed to bar 18 and bearing against the inside surface of the glass panel at one or more appropriate points to dampen glass vibration. The elastomeric bumpers may be rigidly affixed to bar 18, or may be made as to be adjusted in an axis perpendicular to the panel to insure firm contact with the glass.

The illustrated embodiment utilizes elastomeric adhesive member 24 to secure bar 18 to panel 16. Since the panel is affixed to the bar, vibration of the panel is prevented in both directions. If the elastomeric bumper alternative is employed, dampening will only be provided in one direction, i.e., towards the bumper; however, the glass will not be restrained from moving away from the bumper, which will render the glass subject to vibration in that direction.

By placing member 18 on the inside surface of the glass panel, it does not interfere with movement of the windshield wiper. Further, the width of the member may be relatively narrow so as to minimize disruption of operator visibility. By utilizing the combination of a rigid member disposed along the vertical axis of the glass pane, and resiliently connecting the member to the inside surface of the glass panel, the glass is prevented from being excited to vibration amplitudes and frequencies, to ultimately prevent the glass from braking or shattering.

While a preferred embodiment of the present invention has been described and illustrated, the invention should not be limited thereto, but may be otherwise embodied within the scope of the following claims.

The embodiments of the invention in which an exclusive property or privilege is claimed are defined as follows:

1. In an assembly for dampening vibration of a glass panel in a vehicle window opening bordered by vehicle body panels, said glass panel having a vertical axis, a horizontal axis, a top edge, a bottom edge, and a pair of opposed side edges, first support means connected to the vehicle body and the top edge of the glass panel, and second support means connected to the vehicle and the bottom edge of the glass panel, wherein the improvement comprises:

a rigid support member disposed adjacent an inside surface of said glass panel substantially parallel to the vertical axis thereof;

a first bracket assembly joined to an upper inside panel of said vehicle body, and to an upper surface of said support member;

a second bracket assembly joined to a lower inside panel of said vehicle body and to a lower surface of said support member; and resilient joining means disposed between the contiguous surfaces of said support member and said glass panel for preventing the glass panel from being excited to vibration amplitudes and frequencies which cause the glass panel to shatter.

2. In the combination in accordance with claim 1 wherein said resilient joining means is formed from a resilient adhesive material for bonding the glass panel to said support member.

3. In the combination in accordance with claim 2 wherein said support member is positioned to substantially pass in line with the centroid of said glass panel.

4. In the combination in accordance with claim 1 wherein said support member is positioned to substantially pass in line with the centroid of said glass panel.

5. In the combination in accordance with claim 1 wherein the length of said support member is substantially co-extensive with the length of the vertical axis of said glass panel.

* * * * *